United States Patent [19]

Capson et al.

[11] Patent Number: 5,701,499

[45] Date of Patent: *Dec. 23, 1997

[54] METHOD AND SYSTEM FOR AUTOMATICALLY ENTERING A DATA SERIES INTO CONTIGUOUS CELLS OF AN ELECTRONIC SPREADSHEET PROGRAM OR THE LIKE

[75] Inventors: Brian Capson, St. John, Canada; Wes Cherry, Bellevue; Jon Devaan, Redmond, both of Wash.; Chris Duncan, Ithaca, N.Y.; Raymond E. Fowkes, Bellevue, Wash.; Christopher E. Graham, Redmond, Wash.; Lisa R. James, Bellevue, Wash.; Timothy W. McGuire, Jr., Issaquah, Wash.

[73] Assignee: Microsoft Corporation, Redmond, Wash.

[*] Notice: The term of this patent shall not extend beyond the expiration date of Pat. No. 5,685,001.

[21] Appl. No.: 857,534

[22] Filed: Mar. 25, 1992

[51] Int. Cl.$^6$ .................................................. G06T 1/00
[52] U.S. Cl. .......................... 395/764; 395/334; 395/342; 395/348; 395/939
[58] Field of Search .......................... 395/148, 149, 395/600, 155, 159, 161, 764, 765, 334, 340, 342, 348, 349, 939; 364/401; 345/145, 157

[56] References Cited

PUBLICATIONS

Lawrence, Lotus, v7 n4, pp. 54–57, Apr. 1991.
Milenbach, "Improv Spreadsheet Takes Next Step", PC Week, v8 n15, pp. 79–83, Apr. 1991.

Cobb et al; *Works Companion: The Definitive Guide to Microsoft Works;* 1988; pp. 196–197, 341–362.

*Lotus 1-2-3 User's Guide (For Windows Release 1.0);* 1991; pp. 4–5, 37–72, 249–261.

*Microsoft Works for Windows version 2.0;* 1991; pp. 93–174.

*Microsoft Excel User's Guide version 3.0;* 1990; pp. 34–35, 76–79, 204–205, 167–169.

"Creating a Series of Dates or Numbers," Microsoft Excel Version 3.0 User's Guide, 1990, pp. 261–264.

*Primary Examiner*—Joseph H. Feild
*Attorney, Agent, or Firm*—Seed and Berry LLP

[57] ABSTRACT

The present invention contemplates a method and system for automatically entering a data series into an electronic spreadsheet program or the like. After the user has selected source cells containing the start of the data series, the manipulation may be carried out with little effort on the part of the user. In a preferred embodiment, to enter a data series, the user merely positions the cursor over a predetermined location on the outside border of the source cells, depresses and holds down a predefined mouse button, drags the border to a new location, and then releases the mouse button. The data series is automatically created based on the contents of the source cells and predetermined criteria.

20 Claims, 15 Drawing Sheets

*FIG. 12*

METHOD AND SYSTEM FOR AUTOMATICALLY ENTERING A DATA SERIES INTO CONTIGUOUS CELLS OF AN ELECTRONIC SPREADSHEET PROGRAM OR THE LIKE

TECHNICAL FIELD

This invention relates generally to data manipulation and particularly to the direct manipulation of cells by a user of an electronic spreadsheet system or the like.

BACKGROUND OF THE INVENTION

A primary use of computers, especially personal computers, is information processing. There is a wide variety of application programs available that "computerize" information processing tasks that were previously performed manually. One such application program is Microsoft Excel, an accounting program for personal or business use. In application programs such as Microsoft Excel, a worksheet is the primary document used to store and manipulate data. One commonly used type of worksheet is a spreadsheet, which is a two or more-dimensional, rectangular grid of a finite number of columns and rows. The intersection of each column and row is a cell, the basic unit of a worksheet in which a user may enter and store data. In order to enter data in a cell or edit the contents of data already stored in a cell, a user must begin by selecting the appropriate cell. The selected cell, also called the active cell, is highlighted in some way to inform the user that the cell is selected. The next data the user types after selecting a cell will be entered into the selected cell or the next command the user chooses will be applied to the selected cell. If more than one cell is selected at a time, the group of cells is highlighted in a uniform manner. The first cell selected in the group of cells is still referred to as the active cell.

The purpose of an electronic spreadsheet is to allow a user to manipulate large amounts of data with relative ease. At some point in time, however, the data needs to be entered into the worksheet. This data entry can take a considerable amount of time and it may involve entering some repetitious data.

To make it easier for users to enter data into the worksheet, spreadsheet programs, such as Microsoft Excel, help users create a series of dates, text, or numbers. Such series are helpful if a user is entering dates, text, or numbers in consecutive cells and each date, text, or number always increases or decreases by a constant amount or factor. Microsoft Excel's Data Series command helps users to enter a data series into the worksheet. The Data Series command is especially useful for creating a series of column or row titles based on incremental time periods, such as weekly or monthly increments, and for creating data tables.

Using one of the prior art data series is more time efficient than entering in the consecutive series of data manually, but there are still drawbacks. To enter a series of dates or numbers, the user must specify the starting value, the direction the user wants to fill (row or column), the increment, decrement, or factor, and, optionally, a stop value for the series. (See FIG. 1A). Microsoft Excel then creates and enters the series based on the user's specifications. If a stop value is not specified, Microsoft Excel will fill the entire selection. More specifically, to carry out the creation of a data series, the user must go through the following steps.

1. In the first cell to be filled with the series, the user must enter the starting value for the series.
2. The user must select the cells in the row or column that are to be filled with the series, including the starting value as the first cell in the selection.
3. The user must choose the command Data from the menu bar and then choose the subcommand Series. A dialog box will appear after the Data Series command has been selected. (See FIG. 1A).
4. If the user's selection is a row, the user must select the "rows" option in the dialog box. If the selection is a column, the user must select the "columns" option in the dialog box.
5. The user must select a type of series from the dialog box, such as linear or date. If the date option is selected, the user must also specify the date unit, i.e., day, weekday, month, year, the user wishes to increment or decrement.
6. The user must specify the step value (increment or decrement) to be used in the series if the step value is not equal to 1.
7. If the user wishes the series to stop at a certain value, the user may enter that value in the stop value box. Otherwise, Microsoft Excel fills the entire selection.

The prior art systems require a user to be familiar with a variety of function keys and edit commands. When a user is entering large amounts of data to a worksheet, it is inconvenient to have to perform so many steps in order to enter a data series into the worksheet. The user is forced to interrupt the data entry and deal with a dialog box. No technique is known in the electronic spreadsheet environment for entering a data series without going through the time consuming series creation-type operations.

SUMMARY AND OBJECTS OF THE INVENTION

The present invention contemplates a method and system for automatically entering a data series into an electronic spreadsheet program or the like. After the user has selected source cells containing the start of the data series, the manipulation may be carried out with little effort on the part of the user. In a preferred embodiment, to enter a data series, the user merely positions the cursor over a predefined location on the outside border of the source cells, depresses and holds down a predefined mouse button, drags the border to a new location, and then releases the mouse button. The data series is created based on the contents of the source cells and predetermined criteria.

Accordingly, it is an object of the present invention to provide an improved method and system for directly entering a data series into an electronic spreadsheet environment or the like.

It is another object of the present invention to make filling a range of cells with values easy, simple, and smart.

BRIEF DESCRIPTION OF THE DRAWINGS

FIGS. 6, 9, and 12 show the electronic spreadsheet window displayed on the display screen of FIG. 1 after a user has enlarged the border of the source cells and released the mouse button to create a data series.

DETAILED DESCRIPTION OF THE INVENTION

The present invention is best understood with reference to the preferred embodiment illustrated in FIGS. 1-14.

Figure 1:
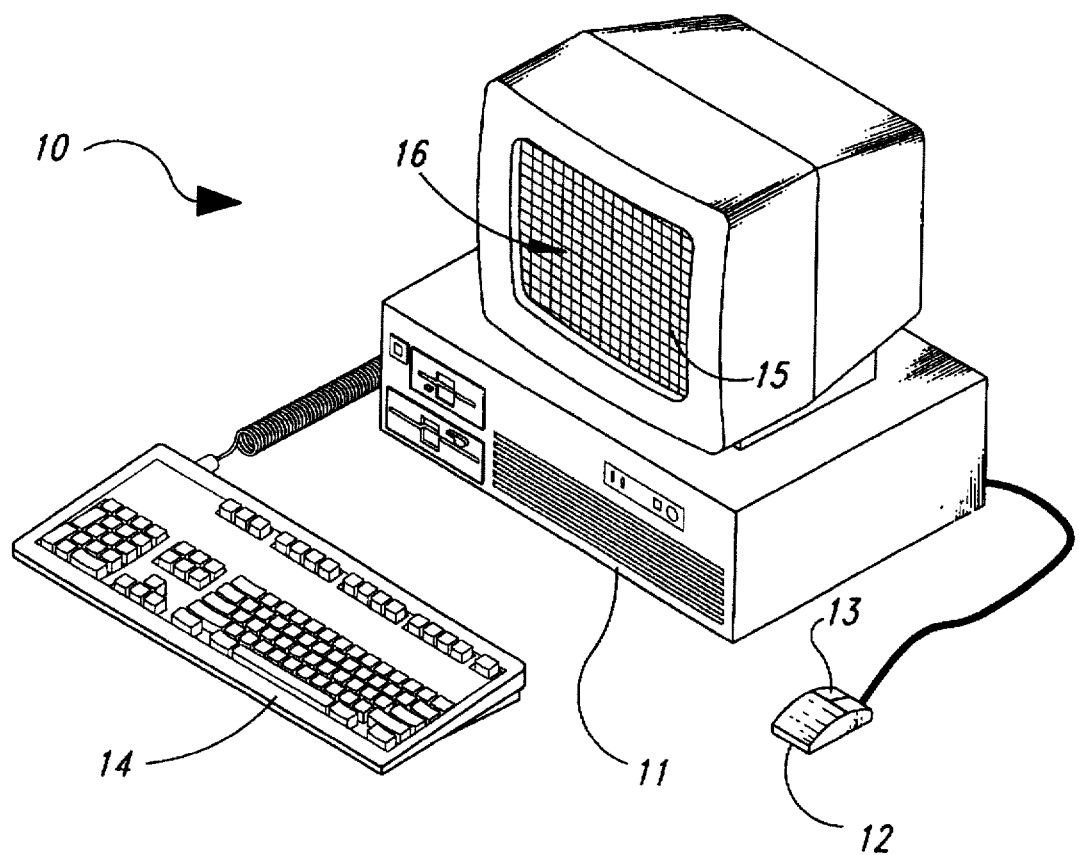
FIG. 1 shows a computer system running an electronic spreadsheet program, the computer system having a mouse, keyboard, and display screen.

FIG. 1 illustrates a computer system 10 running an electronic spreadsheet program. The computer system 10 comprises a CPU 11, a mouse input device 12, including a control input button 13, and keyboard 14, and a display screen 15. The control input button 13 actuates a contact switch to generate selection signals and other commands. The user moves the mouse along a flat surface to generate pointer position input commands, which are supplied to the CPU 11. Mouse movement is translated into x-y coordinates on the display screen 15 in a known manner. A pointer 16 on the display screen 15 moves in connection with the mouse 12.

Figure 1A:
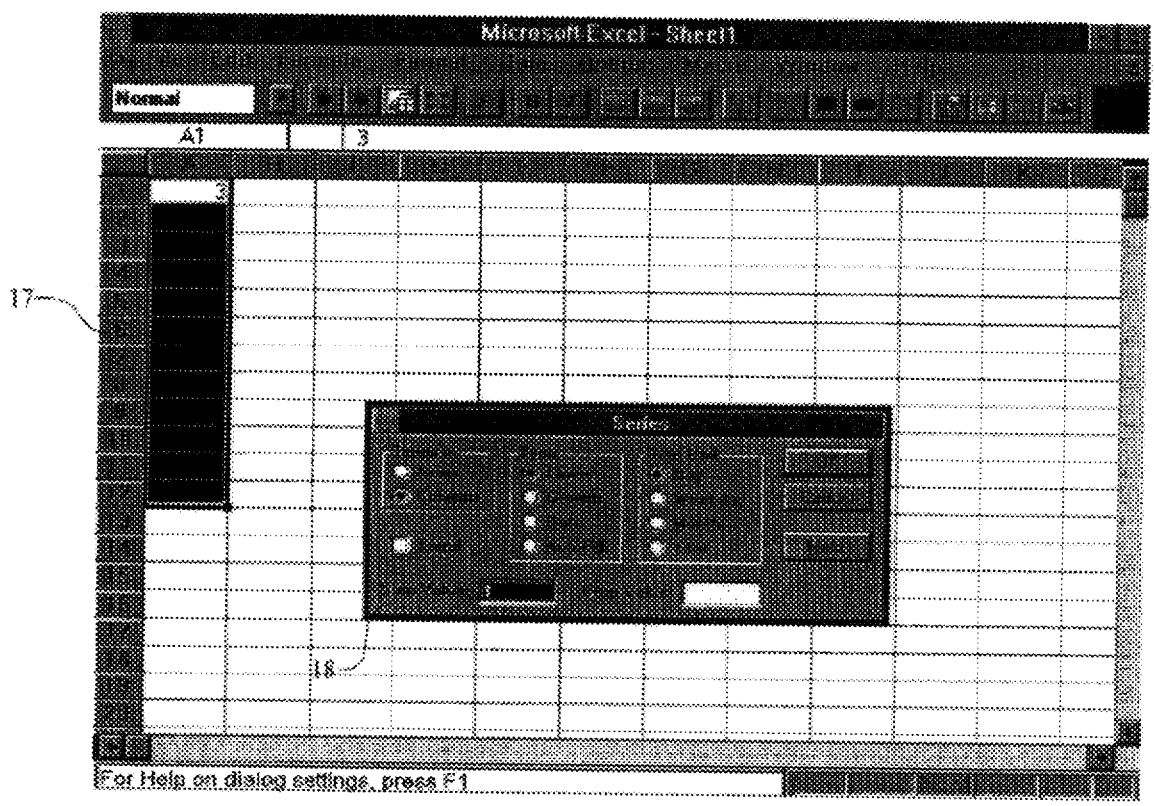
FIG. 1A shows a prior art spreadsheet.

FIG. 1A shows a prior art spreadsheet in the process of creating a data series. The cell selection 17 will contain the data series after it is created. The user chooses options in the dialog box 18 to define the series. The steps discussed above in the background section describe the cumbersome way a data series is created in prior art systems.

Figure 2:
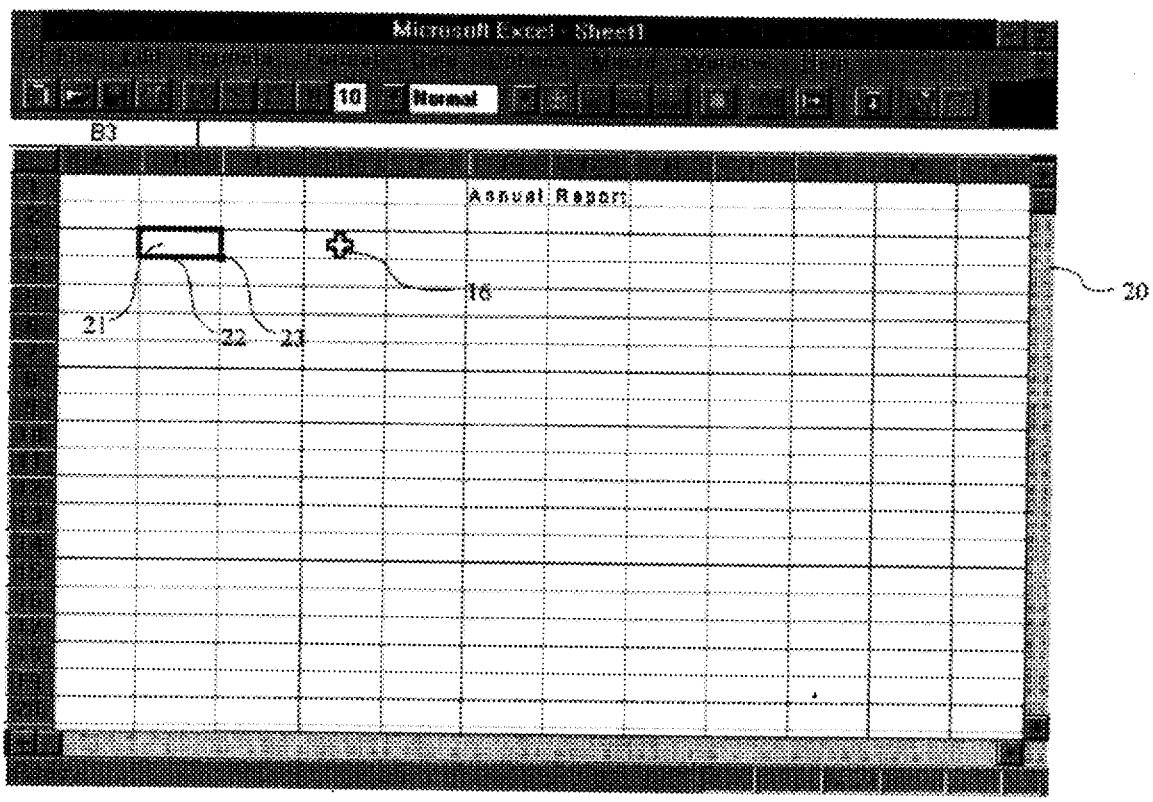
FIG. 2 shows a typical electronic spreadsheet window where the worksheet is arranged in columns and rows, and a pointer as they are seen on the display screen of FIG. 1.

FIG. 2 shows a typical electronic spreadsheet window 20 and a pointer 16 as they are seen on the display screen 15 of FIG. 1. The worksheet contains a grid of columns and rows, the intersection of which is referred to as a cell. The currently selected cell 21 is referred to as the active cell. The active cell 21 is surrounded by a dark border 22. The mouse 12 is used to position the pointer 16, normally in the shape of a plus sign, over the cells displayed in the spreadsheet window 20. When the mouse button 13 is depressed, the cell under the pointer 16 is given a dark border 22 and it becomes the new active cell. If the mouse 12 is moved while the mouse button 13 is depressed, the selection is continued and additional cells are surrounded by the dark border as the pointer 16 is dragged over them to signify the selection. A dark border 22 will appear around the contiguous cells as they are selected. In a preferred embodiment, a fill handle 23 is located in the lower right hand corner of the dark border 22. When more than one cell is selected, all of the selected cells are highlighted except for the first cell in the selection, still called the active cell, which remains white. A multiple cell selection begins with the cell over which the pointer was positioned when the mouse button was depressed, and continues to the cell over which the pointer was positioned when the mouse button was released.

Figure 3:
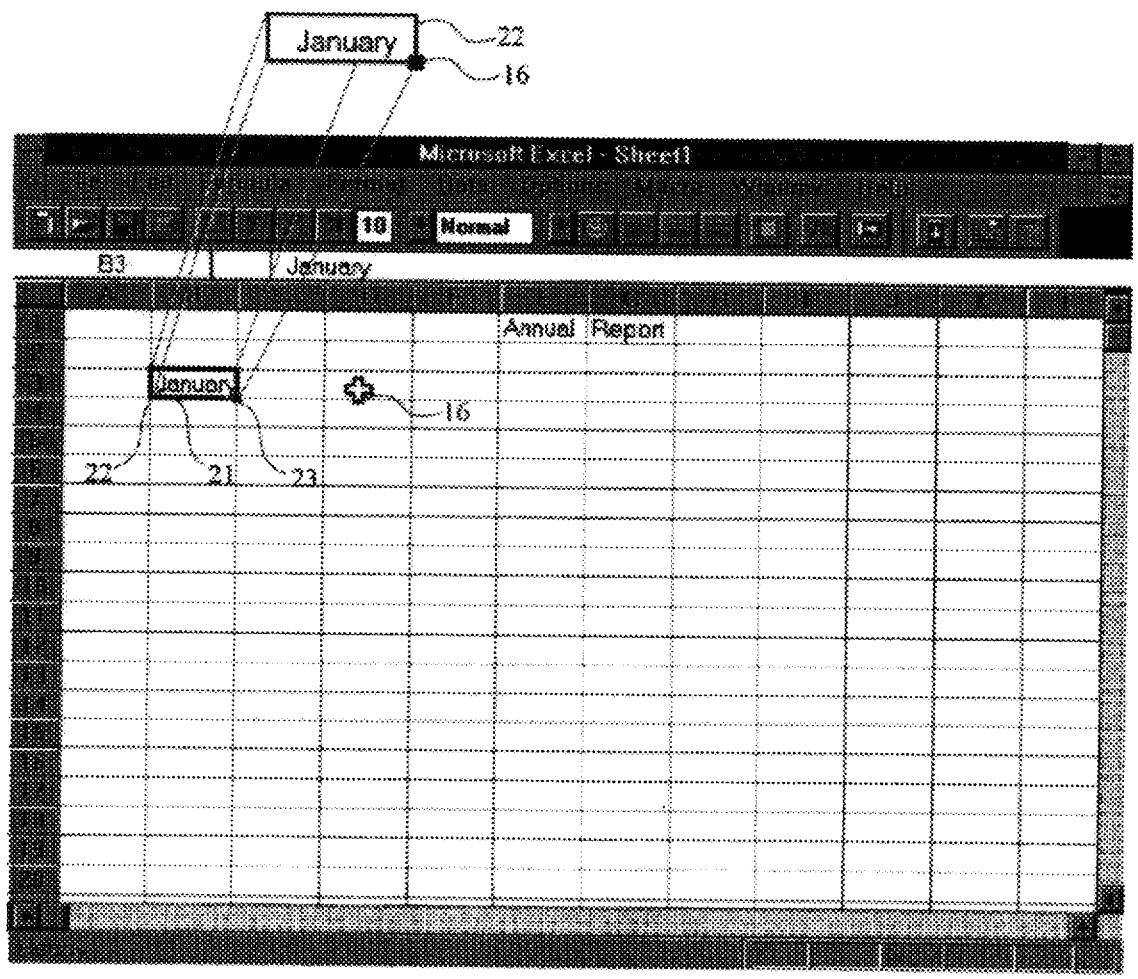
FIGS. 3, 7, and 10 show the electronic spreadsheet window displayed on the display screen of FIG. 1 after a user has made a source cell selection.
Figure 4:
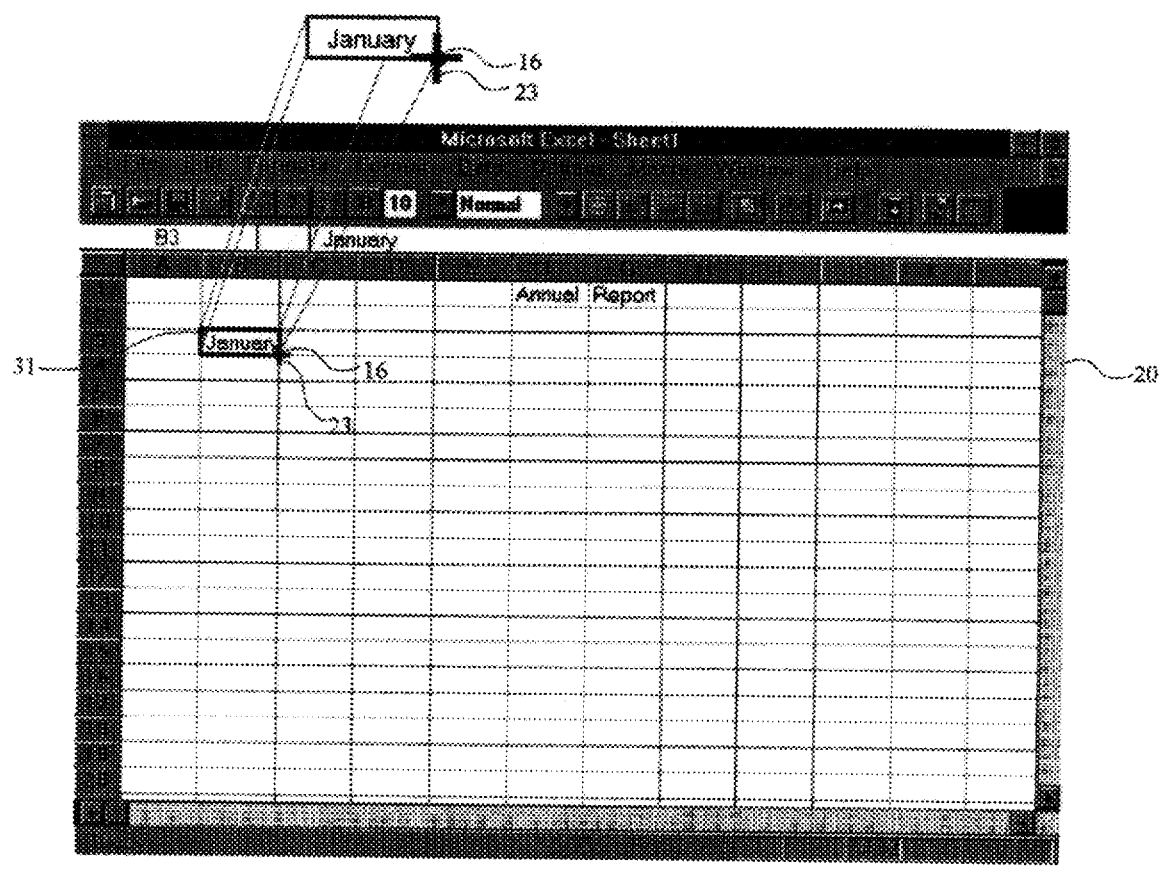
FIG. 4 shows the new shape of the pointer after it has been positioned over the fill handle of the source cell selection in the electronic spreadsheet window on the display screen of FIG. 1.

FIGS. 3–12 are screen prints which illustrate a preferred embodiment of this invention. FIG. 3 shows a single user-selected cell 21. The cell 21 will be the source cell for the creation of the data series. Note the fill handle 23 in the lower right hand corner of the border 22. The pointer 16 is in the shape of a plus sign while the cell selection is being made. After a selection is made, if the mouse button 13 is depressed when the pointer 16 is not over any part of the dark border 22 of the cell selection 21, the selection is cancelled and a new active cell is created under the pointer. FIG. 4 shows the new shape of the pointer 16 after it has been positioned over the fill handle 23 of the cell selection 21. In the preferred embodiment described herein, the pointer 16 takes the shape of a small, thin plus sign while it is positioned over the fill handle 23 of a cell selection 21, indicating to the user that a data series can be created.

Figure 5:
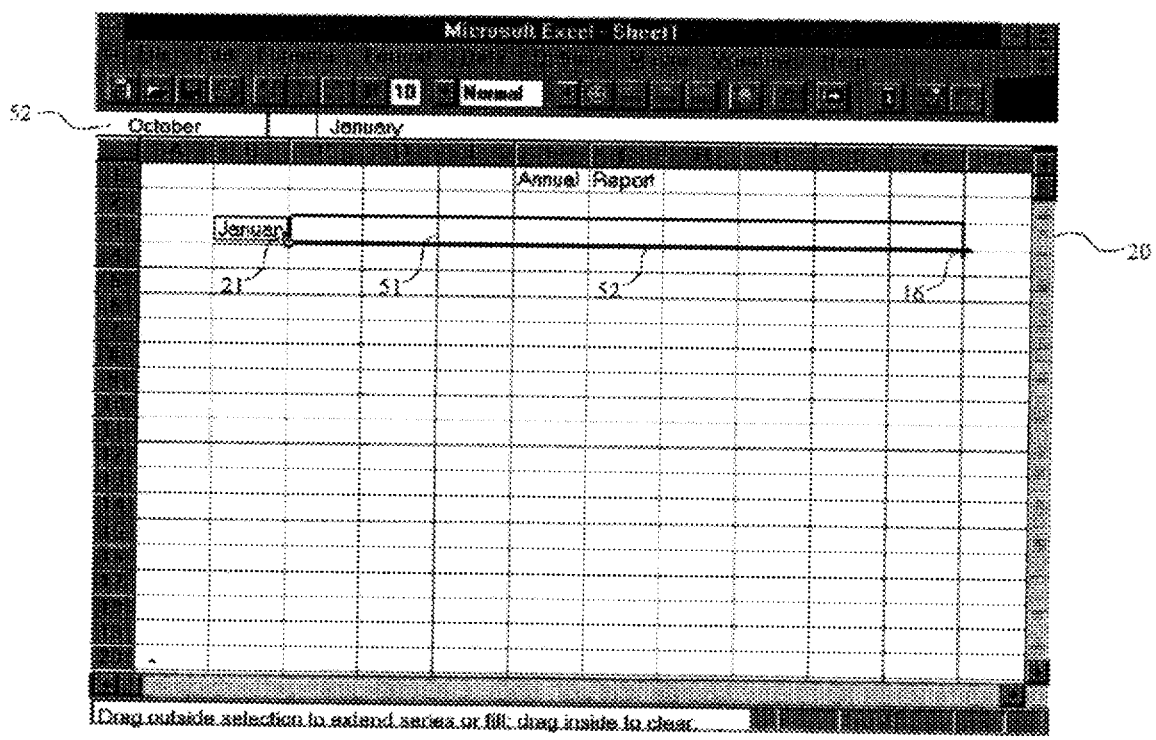
FIGS. 5, 8, and 11 show the electronic spreadsheet window displayed on the display screen of FIG. 1 after a user has selected the destination cells by enlarging the border of the source cells to include additional cells.

FIG. 5 shows the electronic spreadsheet window 20 after the user has selected the destination cells 51 which will contain the data series. The user selected the destination cells by enlarging the source cell selection 21. The user enlarged the source cell selection 21 by depressing the mouse button 13 while the pointer 16 was positioned over the fill handle 23, and then moving the pointer 16 to a new location in the worksheet while holding down the mouse button 13. This procedure is also known as "dragging" the fill handle. (The user has not yet released the mouse button.) A fuzzy border 52 is created to surround the destination cells 51. The system also provides visual feedback 52 to the user regarding the stopping value of the data series as the user is expanding the source cell selection.

Figure 6:
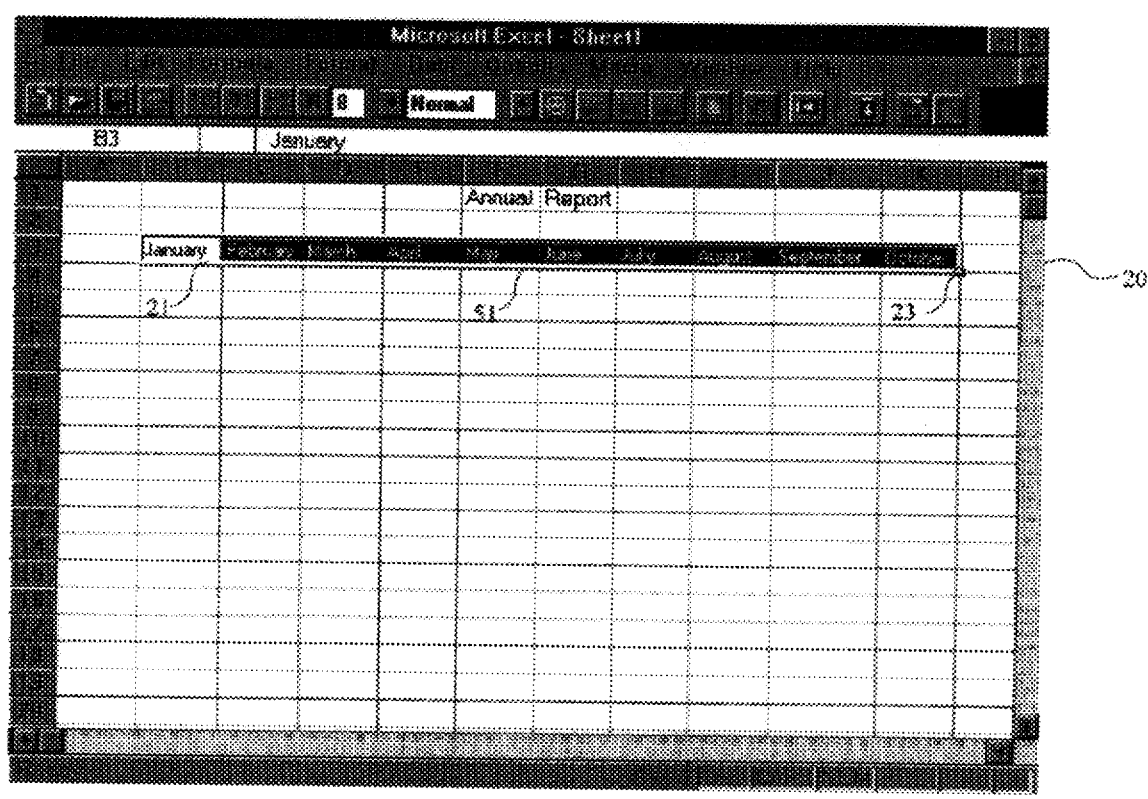

FIG. 6 shows the electronic spreadsheet window 20 after the user has selected the destination cells 51 and released the mouse button 13. The destination cells 51 now contain a data series beginning with the month of January, ending with the month of October and having a month increment. The system took what was in the source cell 31 and created the data series without requiring the user to specify numerous parameters. After the data series is created, the destination cells 51 become new source cells, with a dark border 22 and fill handle 23 in case the user wants to extend the data series even further. The user could have created a data series by extending the border of the source selection in any direction.

Figure 7:
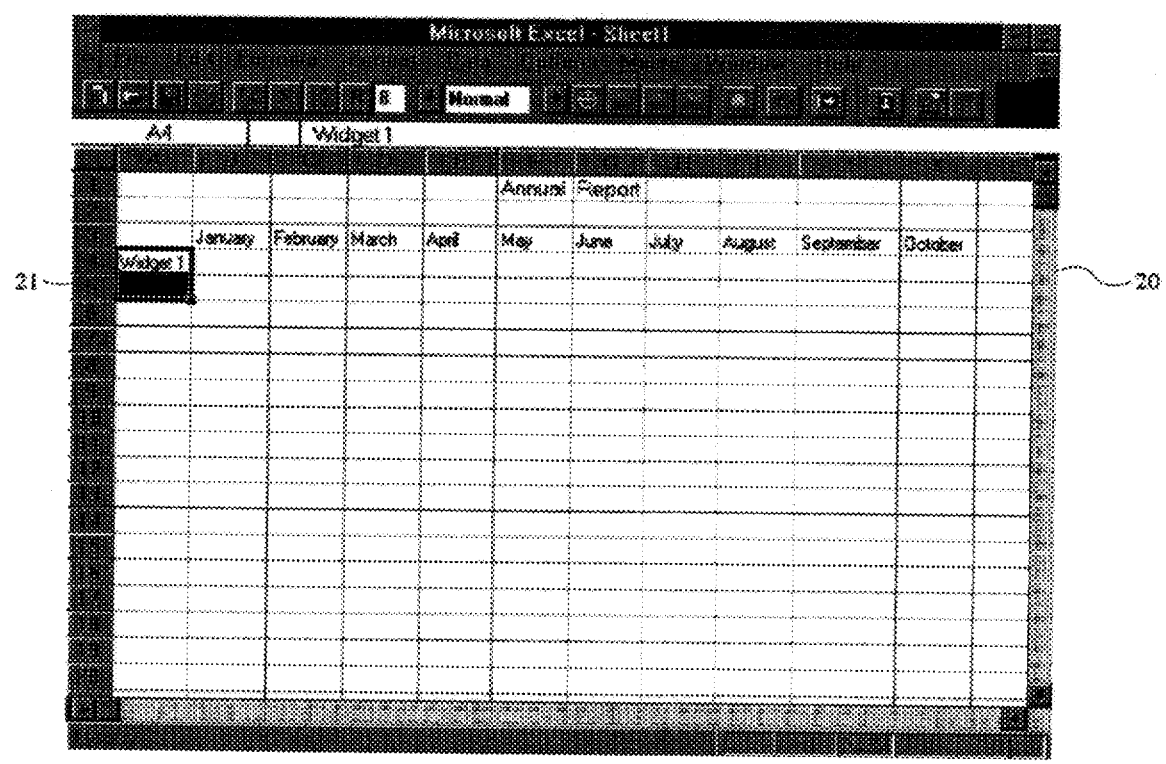
Figure 8:
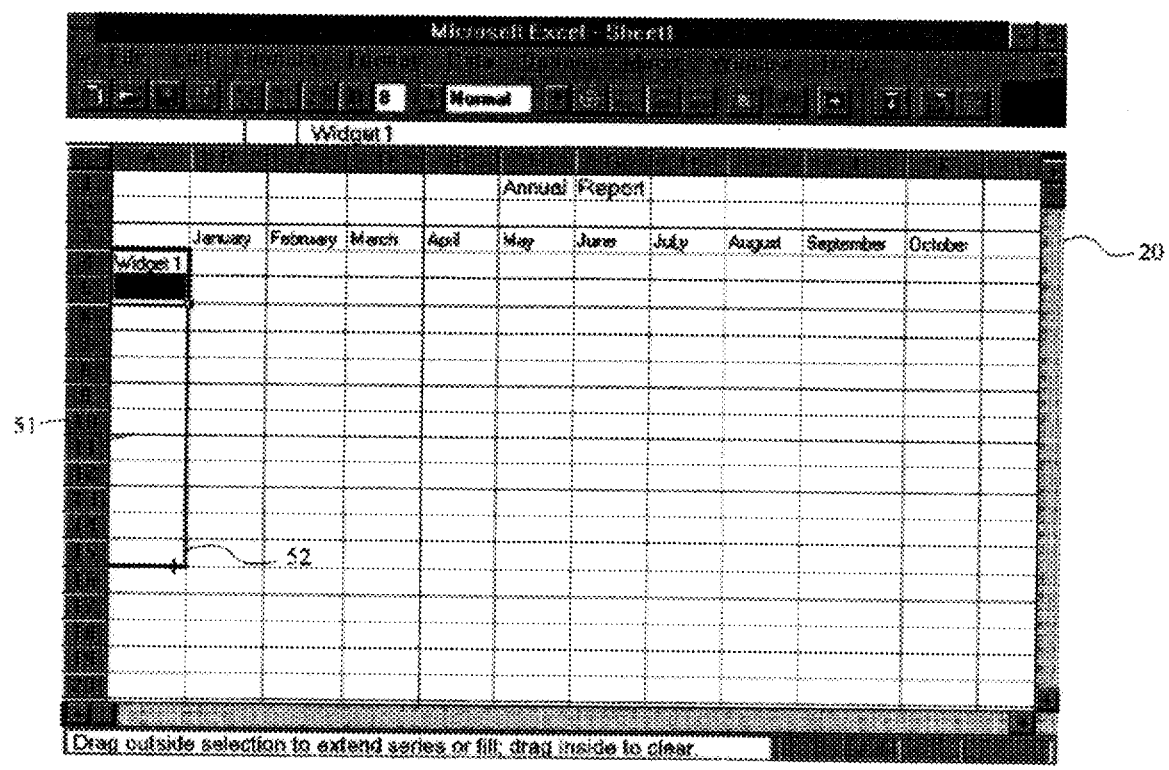
Figure 9:
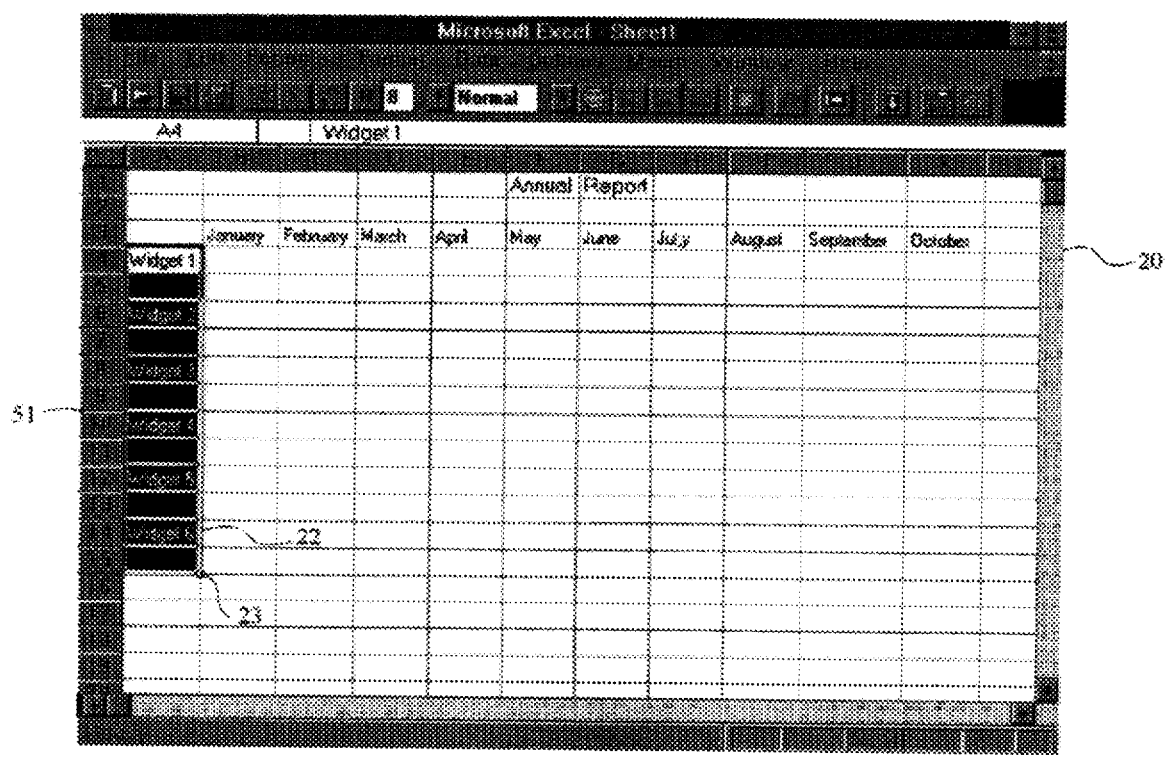

FIG. 7 shows the electronic spreadsheet window 20 after the user has selected a plurality of cells to be the source cells 21. The first cell in the source selection 21 contains text and a number, while the second cell is blank. FIG. 8 shows the electronic spreadsheet window 20 after the user has selected the destination cells 51 in the manner described above. A fuzzy border 52 surrounds the destination cells 51. FIG. 9 shows the electronic spreadsheet window 20 after the user has selected the destination cells 51 and released the mouse button 13. The data series Widget 1, (blank cell), Widget 2, (blank cell), Widget 3, (blank cell), etc., has been automatically created and entered into the spreadsheet.

Figure 10:
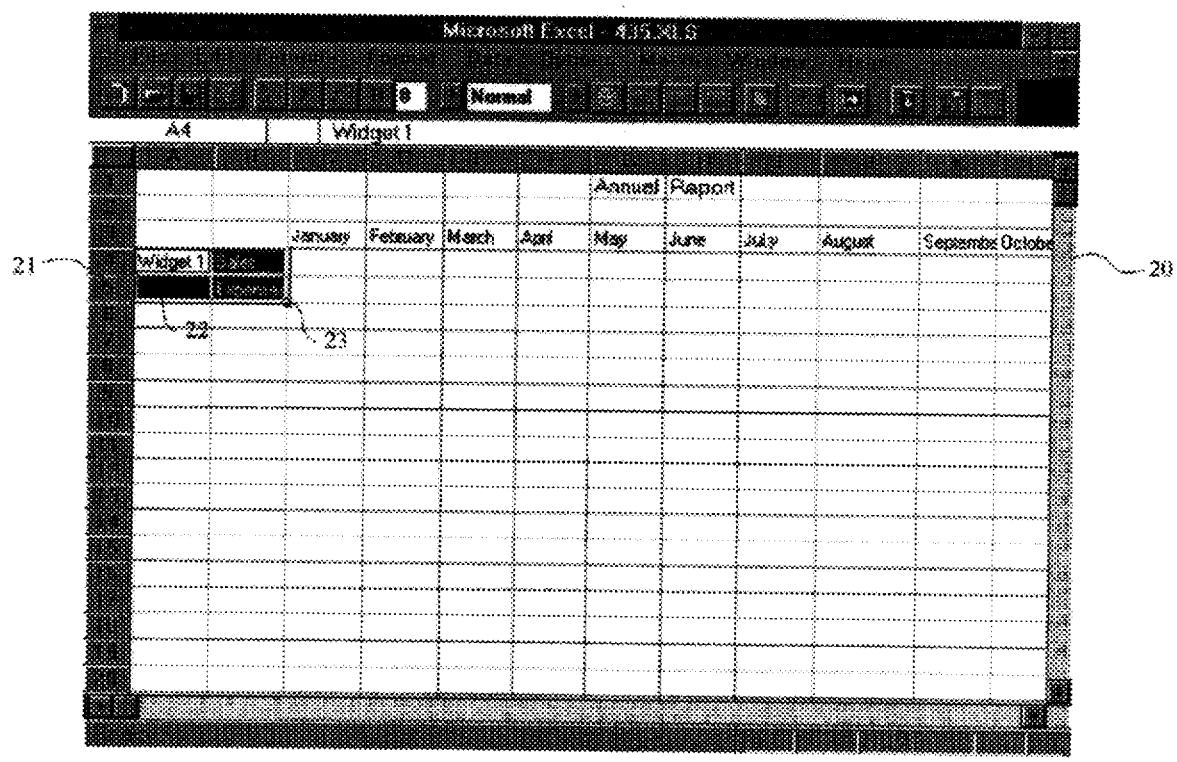
Figure 11:
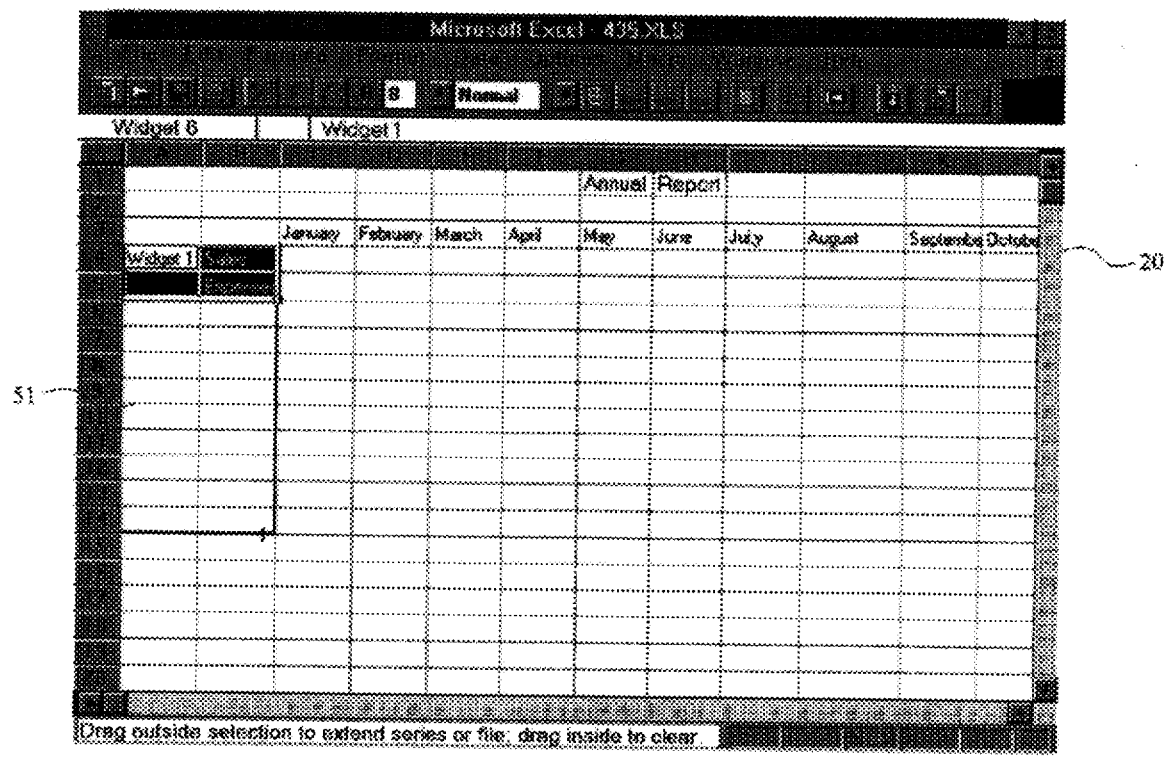
Figure 12:
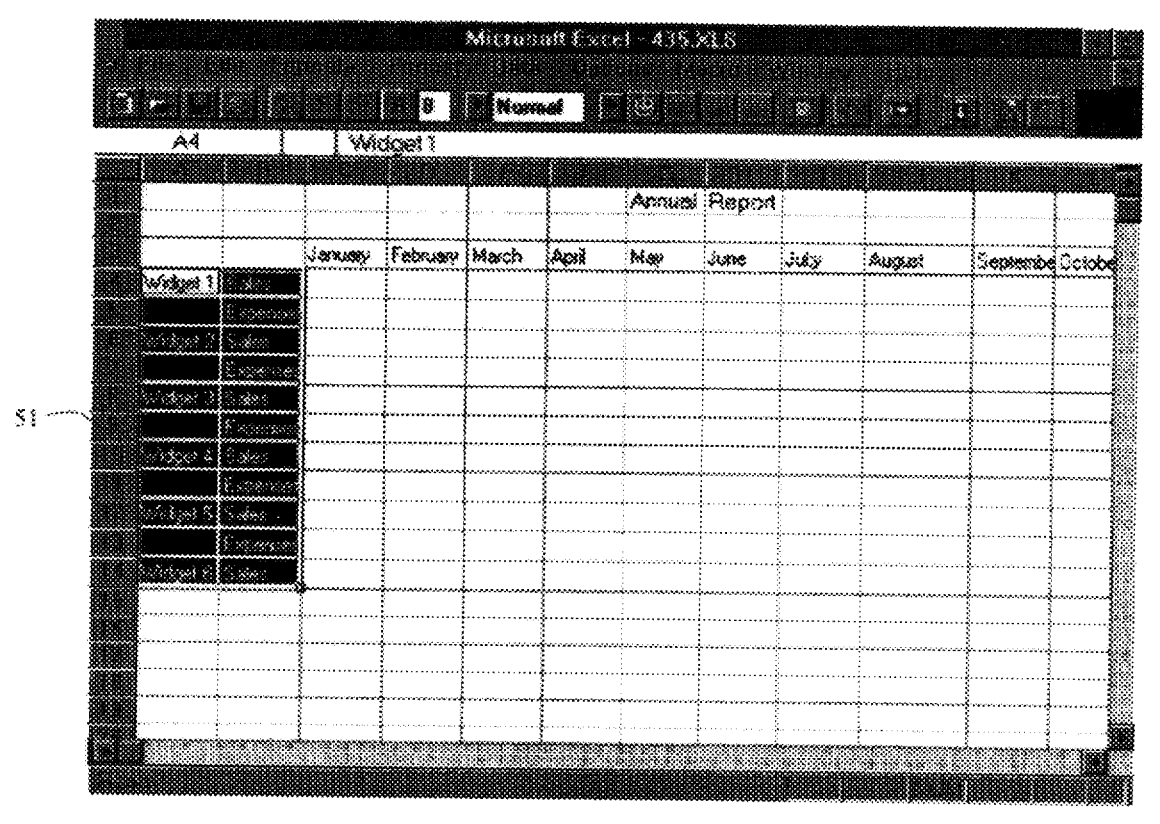

FIG. 10 shows the electronic spreadsheet window 20 after a user has made a two-dimensional source selection 21. The fill handle 23 is once again located in the bottom right corner of the source selection border 22. FIG. 11 shows the electronic spreadsheet window 20 after a user has selected the destination cells 51 in the manner described above. FIG. 12 shows the two-dimensional data series created and entered into the destination cells 51 after the user has selected the destination cells and released the mouse button 13. Note that the data series ended with "Widget 6, Sales" rather than "(blank cell), Expenses." The data series ended this way because the system only continues to series to the end of the destination cells 51, even if it means cutting off the series.

Figure 13:
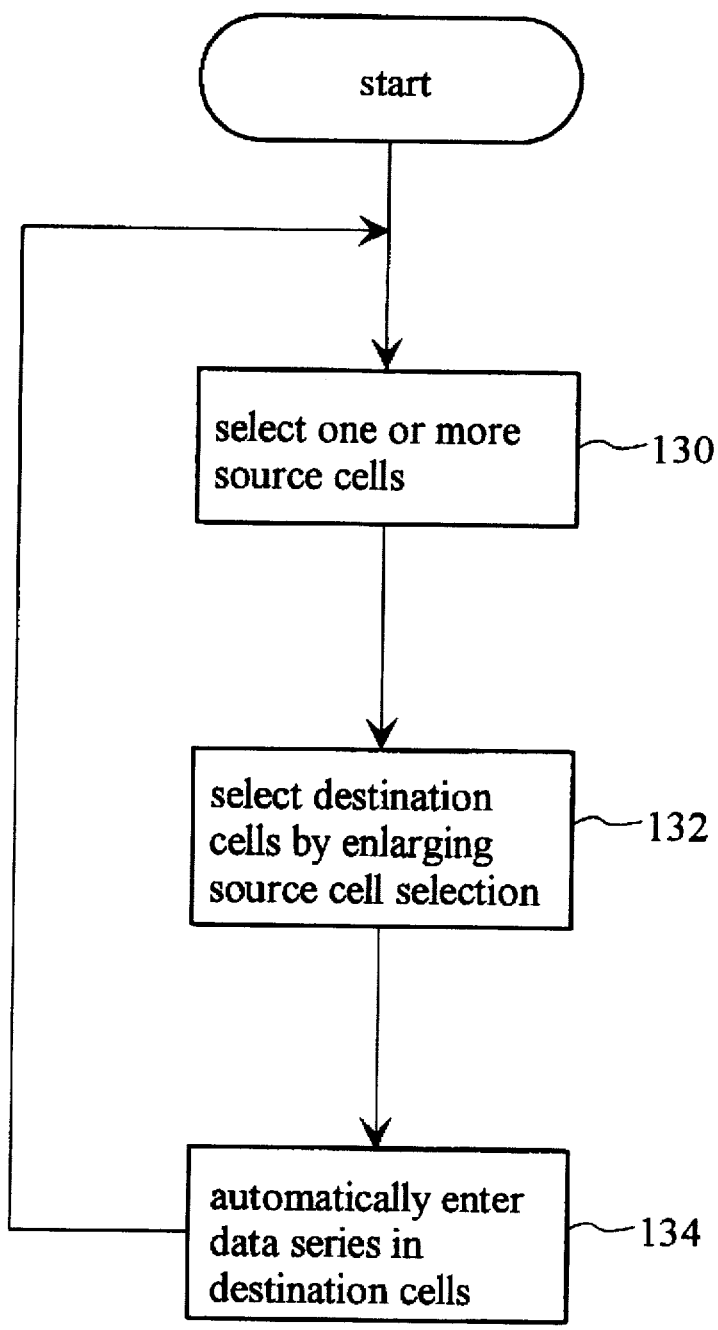
FIG. 13 shows an overview flow diagram of a preferred embodiment of the present invention.

FIG. 13 illustrates an overview flow diagram of the present invention. In block 130, the user selects one or more source cells, where at least one cell contains data. The data in the source cells will be the beginning of the data series.

The process continues on to block 132, where the user then selects the destination cells that will contain the data series. After the destination cells are selected, in block 134 the system automatically creates a data series and enters the data series into the destination cells. The creation of the data series depends on a comparison of the contents of the source cells with predetermined criteria. In a preferred embodiment of the present invention, Table A contains such predetermined criteria.

TABLE A

| Data Type | Source = 1 cell | Source = 2 cells | Source > 2 cells |
|---|---|---|---|
| Text | Replicate | Replicate pattern | Replicate pattern |
| Number | Replicate | Linear | Linear fit |
| Special Text | Linear | Linear | Replicate pattern/Linear |
| Text + Number | Linear | Linear | Replicate pattern/Linear |
| Dates & Times | Linear | Linear | Replicate pattern/Linear |
| Mixed | N/A | Replicate pattern/Linear | Replicate pattern/Linear |
| Formulas | Replicate | Replicate pattern | Replicate pattern |

Alternatively, a user may override the predetermined criteria by using control keys in addition to the mouse. For example, a user could depress the control key while dragging the fill handle to indicate that the source cells should be replicated instead of made into a linear series.

The system first determines how many cells are in the source selection, and then what data types are contained in each of the source cells. For example, if the source cell selection consisted of one cell, which contained a number, the data series would merely be a replication of the number in the source cell. If the source cell selection consisted of two cells, with each cell containing unique numbers, the data series would be a linear series beginning with the two numbers in the source cells. In accordance with the preferred embodiment described herein, Table B contains examples of source cell selections, their data types, and the corresponding data series that would be entered into the destination cells.

TABLE B

| Source Cells | Data Type | Destination Cells |
|---|---|---|
| 1, 2 | Numeric | 1, 2, 3, . . . |
| 1, 1 | Numeric | 1, 1, 1, . . . |
| 2, 4 | Numeric | 2, 4, 6, . . . |
| 2 | Numeric | 2, 2, 2, . . . |
| a | Text | a, a, a, . . . |
| a, b, | Text | a, b, a, b, . . . |
| a, b, c, | Text | a, b, c, a, b, c, . . . |
| 1/1/90 | Dates/Times | 1/1/90, 1/2/90, 1/3/90 |
| Jan-90 | Dates/Times | Jan-90, Feb-90, Mar-90 |
| 1/90 | Dates/Times | 1/90, 2/90, 3/90 |
| 1/5/90, 2/5/90 | Dates/Times | 1/5/90, 2/5/90, 3/5/90, . . . |
| 1/30/92 | Dates/Times | 1/30/92, 2/28/92, 3/30/92, . . . |
| 1/90, 1/92 | Dates/Times | 1/90, 1/92, 1/94, . . . |
| Mon. | Special Text | Mon., Tue., Wed., . . . |
| Mon., Mon. | Special Text | Mon., Mon., Mon., . . . |
| Monday, Wednesday | Special Text | Monday, Wednesday, Friday, . . . |
| Sunday, Saturday | Special Text | Sunday, Saturday, Friday, Thursday, . . . |
| qtr 1 | Special Text | qtr 1, qtr 2, qtr 3, qtr 4, qtr 1, . . . |
| Quarter 1 | Special Text | Quarter 1, Quarter 2, Quarter 3, Quarter 4, . . . |
| WIDGET 1 | Text/Number | WIDGET 1, WIDGET 2, WIDGET 3, WIDGET 4, WIDGET 5, . . . |
| 1a, 2a | Text/Number | 1a, 2a, 1a, 2a, . . . |
| WIDGET, 1 | Text/Number | WIDGET, 1, WIDGET, 2, WIDGET, 3, . . . |
| Monday, 1 | Text/Number | Monday, 1, Tuesday, 2, Wednesday, 3, . . . |
| +A1+A3 | Formula | +A1+A3, +B1+B3, +C1+C3, . . . (when destination cells are to the right of source cell) |
| +A1+A3 | Formula | +A1+A3, +A2+A4, +A3+A5, . . . (when destination cells are under Source cell) |
| SUM(A1:A8) | Formula | SUM(B1:B8), SUM(C1:C8), . . . |

Figure 14:
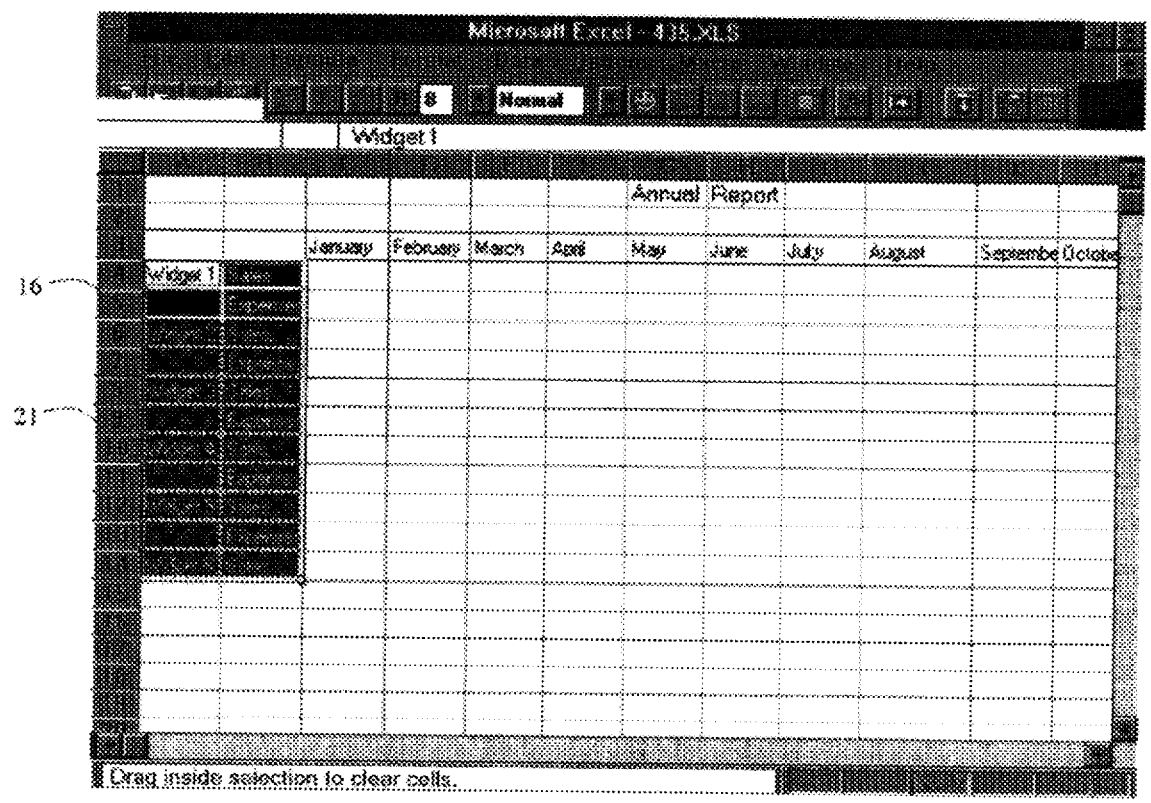
FIG. 14 shows the electronic spreadsheet window displayed on the display of FIG. 1 after a user has positioned the pointer over the fill handle, depressed the mouse button, and then dragged the fill handle back into the selection.

An additional feature of the present invention allows a user to clear a selection by dragging the fill handle into the selection. FIG. 14 illustrates this feature. To clear some of the cells in the selection 21, namely, the user merely has to drag the fill handle into the selection 21 and over cell A6 and then release the mouse button. FIG. 14 shows the electronic spreadsheet window 20 after a user has dragged the fill handle back into the selection 21, but before the user has released the mouse button 13. The cells about to be cleared are blocked out. As soon as the user releases the mouse button, the blocked-out cells will be cleared. Alternatively, control keys could be used in combination with mouse buttons to give the user other options, such as removing the cells from the worksheet instead of just clearing the contents.

Although the present invention has been described in terms of preferred embodiments, it is not intended that the invention be limited to these embodiments. Modifications within the spirit of the invention will be apparent to those skilled in the art. The scope of the present invention is defined by the claims that follow.

We claim:

1. A method of manipulating data in a computer system running a program under the operation of a user, the data having one of a plurality of possible data types, wherein the program uses a worksheet to store and manipulate data, the worksheet consisting of a grid of intersecting columns and rows, and wherein the intersection of each column and row is a cell which stores data, the method comprising the steps of:

selecting one or more source cells in the worksheet in response to user input, such that at least one source cell contains data;

selecting one or more destination cells in response to user input;

in response to selecting source cells and selecting destination cells, determining a data series wherein the program, under computer implementation, determines the data series by ascertaining the data type of the data in the one or more source cells, and by performing calculations using data in the source cells to determine data values for the destination cells and entering the determined data series into the destination cells.

2. The method of claim 1 wherein the computer system has a display device, and including, subsequent to the step of selecting one or more source cells, the step of displaying on the display device a border around the perimeter of the source cells, and wherein the step of selecting one or more destination cells in response to user input includes resizing the border around the perimeter of the one or more source cells in response to user dragging of the border to include additional cells contiguous to the one or more source cells.

3. The method of claim 2 wherein the computer system has a user controllable pointer positioning device with signal generating means, the pointer positioning device used to position a pointer displayed on the display device and including prior to the step of resizing the border the steps of:

positioning the pointer over a predetermined location on the border around the one or more source cells;

while positioning the pointer over the predetermined location, actuating the signal generating means to generate a first signal;

while continuing to generate the first signal, repositioning the pointer over a new area of the worksheet;

displaying the border, the border having a size such that the predetermined location on the border is located under the pointer; and after repositioning the pointer, deactuating the signal generating means to generate a second signal.

4. The method of claim 3 wherein the signal generating means comprises a user controllable button, wherein the step of actuating the signal generating means includes depressing the user controllable button, and wherein the step of deactuating the signal generating means includes releasing the user controllable button.

5. The method of claim 3 wherein the pointer has a shape and wherein the step of positioning the pointer includes changing the shape of the pointer to indicate to the user that the pointer is over the predetermined location on the border around the perimeter of the one or more source cells.

6. The method of claim 3 wherein the predetermined location on the border around the perimeter of the one or more source cells is the lower right hand corner of the border.

7. The method of claim 1 wherein the step of determining a data series includes the steps comparing the data in the one or more source cells to predetermined criteria;

determining a starting value, an increment value, and an ending value for the data series based on the comparison of the data in the source cells with the predefined criteria; and creating the data series based upon the determined starting value, increment value, and ending value.

8. The method of claim 1 wherein the step of selecting one or more destination cells includes selecting the one or more source cells plus additional cells contiguous to the one or more source cells.

9. A method of manipulating data in a computer system running a program under the operation of a user, wherein the computer system has a display device and a user controllable pointer positioning device with signal generating means, the pointer positioning device used to position a pointer displayed on the display device, wherein the program uses a worksheet to store and manipulate data, the worksheet consisting of a grid of intersecting columns and rows, and wherein the intersection of each column and row is a cell which stores data, the method comprising the steps of:

in response to user manipulation of the pointer positioning device, selecting one or more source cells in the worksheet such that at least one of the source cells contains data;

displaying a border around the perimeter of the one or more source cells on the display device;

in response to user manipulation of the pointer positioning device, positioning the pointer over a predetermined location on the border around the perimeter of the one or more source cells;

in response to user actuation of the signal generating means while the pointer is positioned over the predetermined location, generating a first signal;

in response to the user movement of the pointer positioning device while the first signal is generated, selecting one or more destination cells by resizing the border in coordination with the user movement of the pointer so that the predetermined location on the border remains under the pointer;

after resizing the border and in response to user deactuation of the signal generating means, generating a second signal;

in response to selecting source cells and selecting destination cells, determining a data series wherein the program, under computer implementation, determines the data series by ascertaining the type of data in the one or more source cells and by performing calculations using data in the source cells to determine data values for the destination cells and entering the determined data series into the destination cells.

10. A computer implemented method of entering a data series into a computer program operating on a computer system, wherein the computer system has a display device, wherein the program causes a worksheet to be displayed on the display screen, the worksheet consisting of a grid of intersecting columns and rows, and wherein the intersection of each column and row is a cell which stores data, the method comprising the steps of:

selecting one or more source cells in the worksheet in response to user input, such that at least one source cell contains data;

selecting one or more destination cells in response to user input;

determining a starting value and an increment value for the data series wherein the program, under computer implementation, determines the data series based upon data contained in the one or more source cells and enters the data series into the destination cells after determining the starting value and the increment value.

11. The method of claim 10 including, subsequent to the step of selecting the one or more source cells, displaying on the display device a border around the perimeter of the one or more source cells.

12. The method of claim 10 wherein the step of selecting one or more destination cells includes selecting the one or more source cells plus additional cells contiguous to the one or more source cells.

13. The method of claim 10 wherein the source cells are numbered by their order of selection and wherein the step of determining a starting value and an increment value for the data series includes the additional steps of:

setting the starting value equal to data contained in the first source cell;

comparing the data contained in the source cells to predetermined criteria; and setting the increment value equal to a value based on the comparison of the contents of the source cells with predefined criteria.

14. A method of manipulating data in a computer system running a program under the operation of a user, the data having one of a plurality of possible data types, wherein the computer system has a display device, wherein the program uses a worksheet to store and manipulate data, the worksheet consisting of a grid of intersecting columns and rows, and wherein the intersection of each column and row is a cell which stores data, the method comprising the step of:

selecting one or more source cells in response to user input, such that at least one source cell contains data;

displaying on the display device a border around the source cells;

selecting one or more destination cells in response to user resizement of the border around the one or more source cells;

in response to selecting source cells and selecting destination cells, determining a data series, wherein the program, under computer implementation, determines the data series by ascertaining the data type of the data in the one or more source cells and enters the determined data series into the destination cells.

15. The method of claim 14 wherein the computer system has a user controllable pointer positioning device with signal generating means, the pointer positioning device used to position a pointer displayed on the display device, and wherein the step of selecting a plurality of destination cells includes the steps of:

in response to user movement of the pointer positioning device, positioning the pointer over a predetermined location on the border around the one or more source cells;

in response to user actuation of the signal generating means and while positioning the pointer over the predetermined location, generating a first signal;

in response to user movement of the pointer positioning device and while generating the first signal, repositioning the pointer over a new location on the worksheet; and in conjunction with the repositionment of the pointer positioning device and the generation of the first signal, resizing the border so that the border surrounds the plurality of destination cells, the plurality of destination cells including the one or more source cells plus additional cells contiguous to the source cells.

16. A method of manipulating data in a computer system executing a computer program, wherein the computer program uses a worksheet consisting of a grid of intersecting columns and rows, wherein the intersection of each column and row is a cell which stores data, a plurality of cells for storing a data series, each data series having a data series type which defines permissible values which may be associated with the data series, the method comprising the steps of:

selecting a source cell in the worksheet, the source cell containing data to be used in determining the data series;

selecting one or more destination cells contiguous to the source cell to store the data series;

comparing the data in the source cell to a set of criteria;

in response to the comparison, determining the data series type;

the program, under computer implementation, determining a starting value and an increment value based on the data series type;

the program, under computer implementation, creating the data series based upon the determined starting value and increment value; and the program, under computer implementation, storing the created data series in the destination cells.

17. A computer system for manipulating data, the computer system including a program under the operation of a user, wherein the program uses a worksheet to store and manipulate data, the worksheet consisting of a grid of intersecting columns and rows, and wherein the intersection of each column and row is a cell which stores data, the system comprising:

a source cell selector for selecting one or more source cells in the worksheet in response to user input, such that at least one source cell contains data;

a destination cell selector for selecting one or more destination cells in response to user input, such that the destination cells consist of cells contiguous to the source cells;

a data series determiner for determining by the program, under computer implementation, a data series by analyzing data contained in the one or more source cells in response to the source cell selection and the destination cell selection; and a data storer for entering, by the program under computer implementation, the determined data series into the destination cells.

18. A computer system for manipulating data, the computer system including a program under the operation of a user, wherein the computer system has a user controllable pointer positioning device with signal generating means, the pointer positioning device used to position a pointer displayed on the display device, wherein the program uses a worksheet to store and manipulate data, the worksheet consisting of a grid of intersecting columns and rows, and wherein the intersection of each column and row is a cell which stores data, the system comprising:

a source cell selector for selecting, in response to user manipulation of the pointer positioning device, one or more source cells in the worksheet such that at least one of the source cells contains data;

a display device for displaying a border around the perimeter of the one or more source cells on the display device;

a pointer positioner for positioning the pointer over a predetermined location on the border around the perimeter of the one or more source cells, in response to user manipulation of the pointer positioning device;

a first signal generator for generating a first signal in response to user actuation of the first signal generator while the pointer is positioned over the predetermined location;

a destination cell selector for selecting one or more destination cells, in response to the user movement of the pointer positioning device while the first signal is generated, by resizing the border in coordination with the user movement of the pointer so that the predetermined location on the border remains under the pointer;

a second signal generator for generating a second signal after resizing the border and in response to user deactuation of the first signal generating means;

a data series determiner for determining a data series by the program under computer implementation in response to the selection of the source cells and the selection of the destination cells; and a data storer for automatically filling each of the one or more destination cells by the program under computer implementation with an element of the determined data series.

19. A computer system for entering a data series into a program operating on the computer system, wherein the computer system has a display device, wherein the program causes a worksheet to be displayed on the display screen, the worksheet consisting of a grid of intersecting columns and rows, and wherein the intersection of each column and row is a cell which stores data, the system comprising:

a source cell selector for selecting one or more source cells in the worksheet in response to user input, such that at least one source cell contains data;

a destination cell selector for selecting one or more destination cells in response to user input;

a determiner for determining by the program under computer implementation a starting value and an increment value for the data series based upon data contained in the one or more source cells; and a data storer for automatically entering the data series into the destination cells by the program under computer implementation in response to determining the starting value and the increment value.

20. A computer system for manipulating data, the computer system including a program under the operation of a user, the data having one of a plurality of possible data types wherein the program uses a worksheet to store and manipulate data, the worksheet consisting of a grid of intersecting columns and rows, and wherein the intersection of each column and row is a cell which stores data, the system comprising:

a source cell selector for selecting one or more source cells in response to user input, such that at least one source cell contains data;

a display device for displaying a border around the source cells;

a destination cell selector for selecting one or more destination cells in response to user resizement of the border around the one or more source cells;

a data series determiner for determining a data series by the program under computer implementation by ascertaining the data type of the data in the one or more source cells in response to the selection of the source cells and the selection of the destination cells; and a data storer for entering the determined data series by the program under computer implementation into the destination cells.

* * * * *